April 19, 1949. H. T. LAMBERT 2,467,980
FRICTION ASSEMBLY UNIT FOR BRAKES OR THE LIKE
Filed Aug. 13, 1946 4 Sheets-Sheet 1

Inventor
H. T. Lambert
Robb & Robb
By
Attorneys

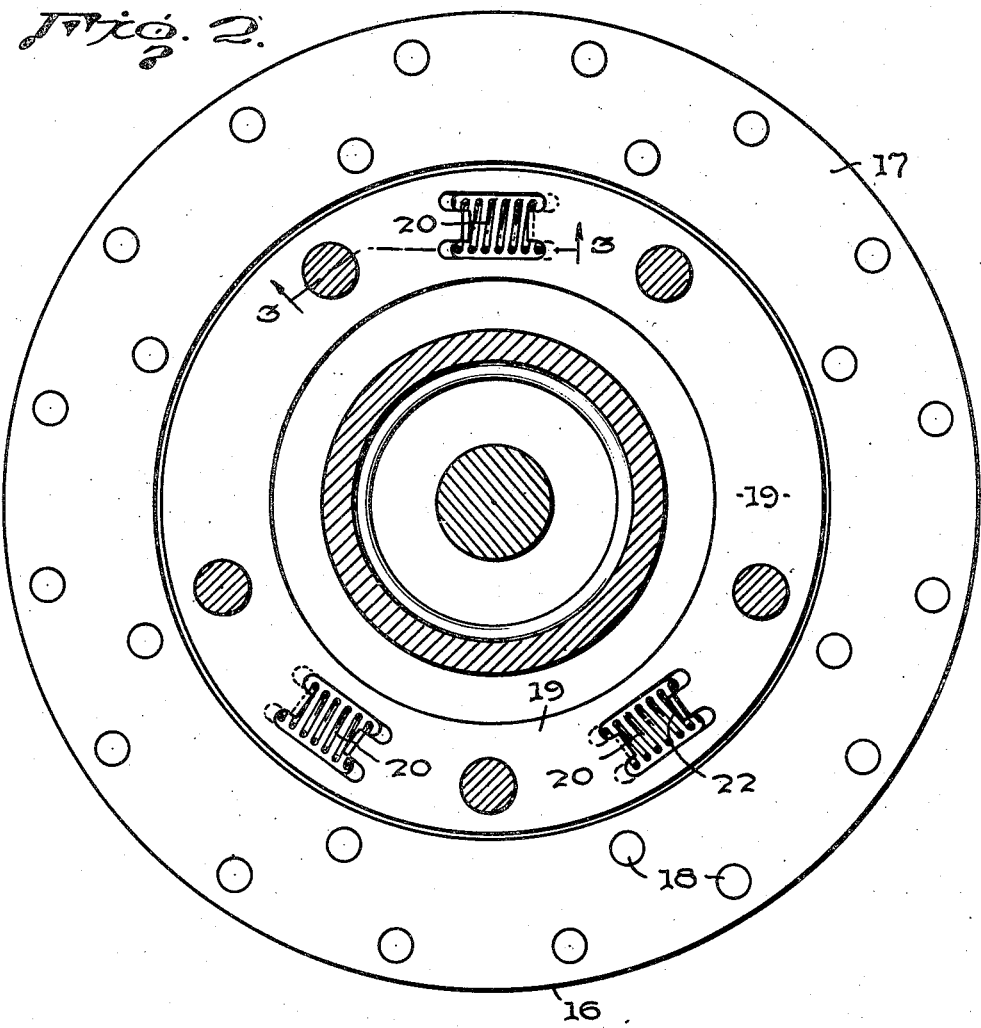
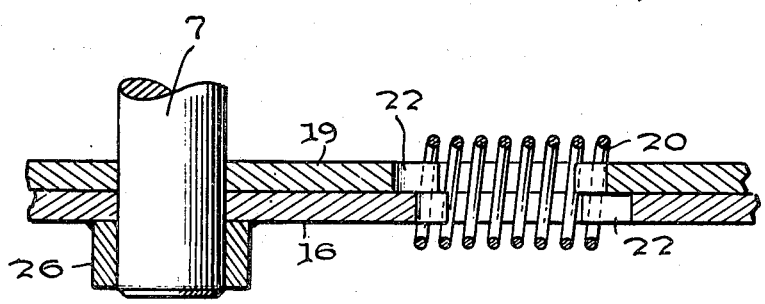

April 19, 1949.   H. T. LAMBERT   2,467,980
FRICTION ASSEMBLY UNIT FOR BRAKES OR THE LIKE
Filed Aug. 13, 1946   4 Sheets-Sheet 3

Inventor
H. T. Lambert
By Robb & Robb
Attorneys

April 19, 1949. H. T. LAMBERT 2,467,980
FRICTION ASSEMBLY UNIT FOR BRAKES OR THE LIKE
Filed Aug. 13, 1946 4 Sheets-Sheet 4

Inventor
H. T. Lambert
By Robb & Robb
Attorneys

Patented Apr. 19, 1949

2,467,980

UNITED STATES PATENT OFFICE 2,467,980

FRICTION ASSEMBLY UNIT FOR BRAKES OR THE LIKE

Homer T. Lambert, St. Joseph, Mich., assignor to Lambert Brake Corporation, St. Joseph, Mich., a corporation of Michigan Application August 13, 1946, Serial No. 690,253

5 Claims. (Cl. 188—218)

The present invention relates to improvements in brakes or clutches of the disc type, and in particular to friction discs employed therein and to a novel method of assembling such disc to form a friction unit.

It is a well known fact that one of the main drawbacks affecting the general adoption of disc brakes for vehicles is the noise or rattle which occurs during operation of such vehicles equipped with this type of brake construction. Many solutions of this problem have been attempted, such as the use of resilient or rubber sleeves or bushings for mounting the friction disc or ring on the stud bolts of the vehicle wheel, an example of which is disclosed in my prior Patent No. 2,354,385, dated July 25, 1944. However, due to the sliding action of the disc or discs, the thinness of the metal ring and the heat effect of braking action, these rubber sleeves are subject to quick wear or deterioration, necessitating relatively frequent replacements or repair.

The object of this invention, therefore, is to eliminate such mounting sleeves, by so constructing the discs themselves that they may be mounted directly upon the wheel studs with metal to metal contact and with sufficient tension upon the studs to prevent rattle-producing looseness, while at the same time permitting freedom of sliding action.

In carrying out my invention, I provide a simple noise dampener, by constructing the friction unit of two parts each with corresponding openings to receive the studs, and arranging said parts in combination with resilient means so as to cause the walls of the openings to be opposingly stressed against the surfaces of the studs. The resilient means employed performs the dual function of connecting the two parts in assembled relation as a unit and producing a yieldable grip mounting, so-called, upon the supporting studs. To this end, the friction element is composed of two rings or discs of sheet metal having identical stud-receiving holes therein and corresponding spring-receiving slots of special form, all stamped therein at one and the same time, while one disc is disposed on top of the other in concentric relation, after which one of the discs is reversed so that, when the springs are seated therein, their expansion tends to shift one disc circumferentially relative to the other, thereby tending to throw the stud receiving holes out of registry with each other. When such unit is assembled, it is forced onto the studs, this action thus bringing the holes into alignment and slightly compressing the springs in the slots, thereby producing the tensional gripping action of the disc assembly on the mounting studs. That is to say, a portion of the wall of a stud opening of one disc is stressed against the coacting stud in opposition to the stressing of the opposite portion of the corresponding hole wall of the other disc thereon.

Other and further objects and advantages of the invention will be hereinafter set forth and the novel features thereof defined by the appended claims.

In the drawings:

Figure 2 is a vertical sectional view on the line 2—2 of Figure 1, and showing the friction unit of this invention in side elevation and the relationship of one brake disc to the other when mounted upon the vehicle wheel studs;

Figure 3 is an enlarged sectional view taken about on the plane of line 3—3 of Figure 2, more particularly disclosing the plates under compression relative to each other when mounted in operative position;

Like reference characters designate corresponding parts in the several figures of the drawings.

Figure 1:
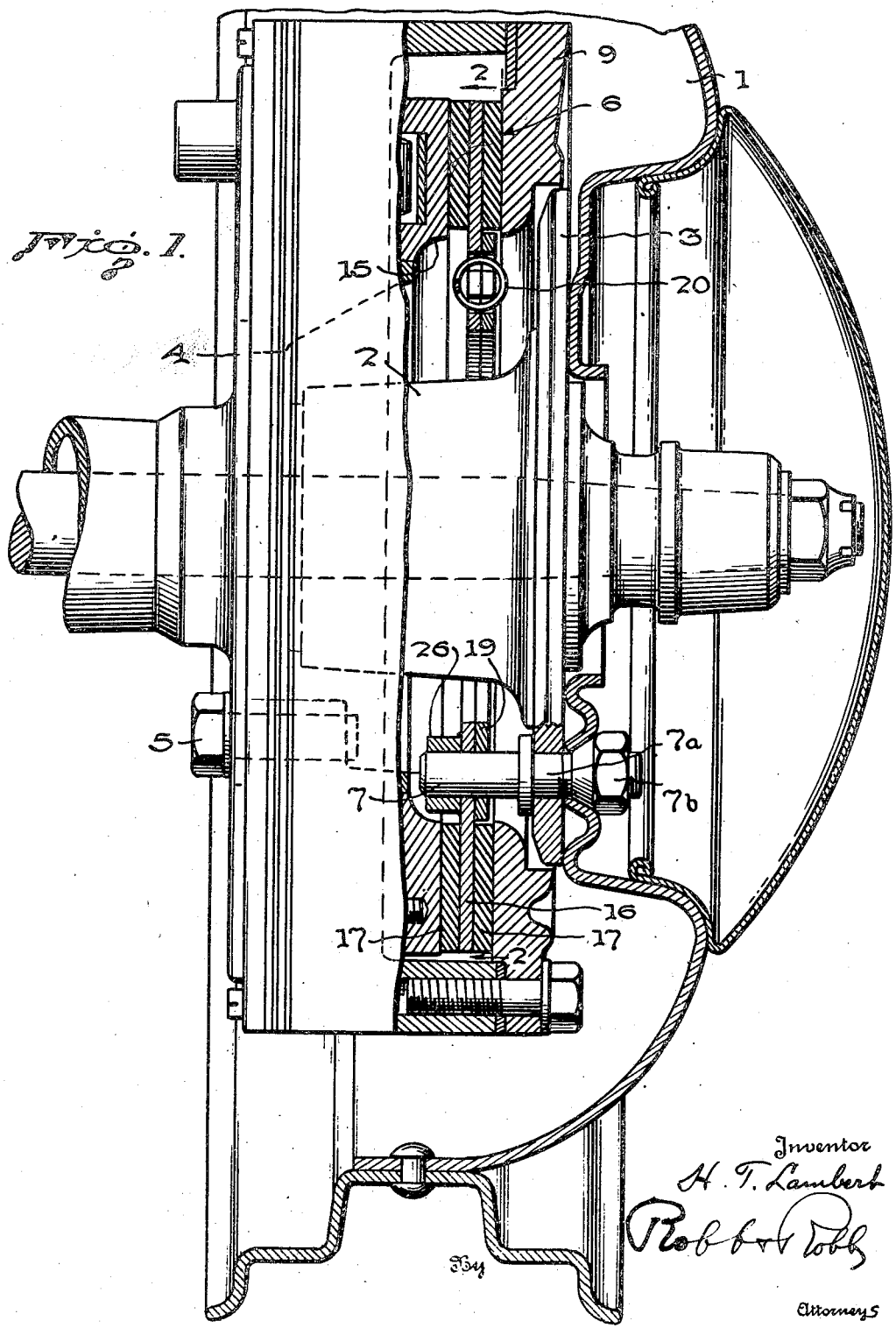
Figure 1 is a view partly in elevation and partly in section showing the application of this friction assembly unit to a disc brake for vehicle wheels.

In describing the details of this invention, I refer to its application in that type of disc brake construction disclosed in my patent hereinbefore noted, but it should be understood that it may be applied to many other forms of mechanisms where a driving member is shiftably mounted on driving studs or lugs having a tendency to be noisy in operation.

In the drawings, 1 refers to a vehicle wheel which is provided with a hub 2 and mounting plate or flange 3, between which and the axle housing flange 4, the braking unit involving the present invention is secured by bolts 5. The rotating member 6 to be braked, otherwise herein referred to as the friction unit assembly, is slidingly mounted upon a series of driving lugs or studs 7 carried by the wheel. These studs are formed as extensions of bolts 7a by which the wheel 1 is secured to the hub flange 3, as by nuts 7b. The rotating friction unit assembly, therefore, revolves with the wheel.

The cooperation of this unit with the stationary disc or backing plate 9 and the primary disc 15 is fully described in my prior patent referred to and is, therefore, well known, so that further description herein is unnecessary so far as the general operation of the brake construction is concerned. The invention of this disclosure resides in the assembled unit 6 and the details thereof which will now be specifically set forth.

The rotating unit is composed of two discs, the larger one of which is designated 16 and has applied thereto about its peripheral portion upon each face thereof the friction linings 17, 17. These are secured to the disc by a series of rivets 18 arranged in rows, as clearly depicted in Figure 2 of the drawings. The second disc of the friction unit assembly is smaller in diameter and designated 19 in the drawings. It will be observed in Figure 1 particularly that the smaller disc is disposed on that side of the larger disc 16 next adjacent to the secondary disc or plate 9, and is connected to the complemental disc 16 by spiral springs 20 in a manner now to be more specifically described.

Figure 6:
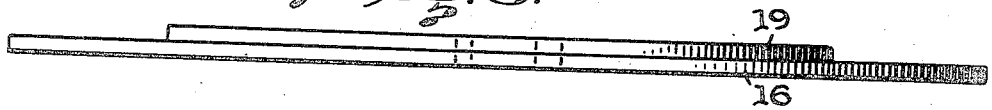
Figure 6 is an edge elevation of the two discs forming the unit arranged for the stamping operation to produce the stud openings and spring-receiving slots.
Figure 7:
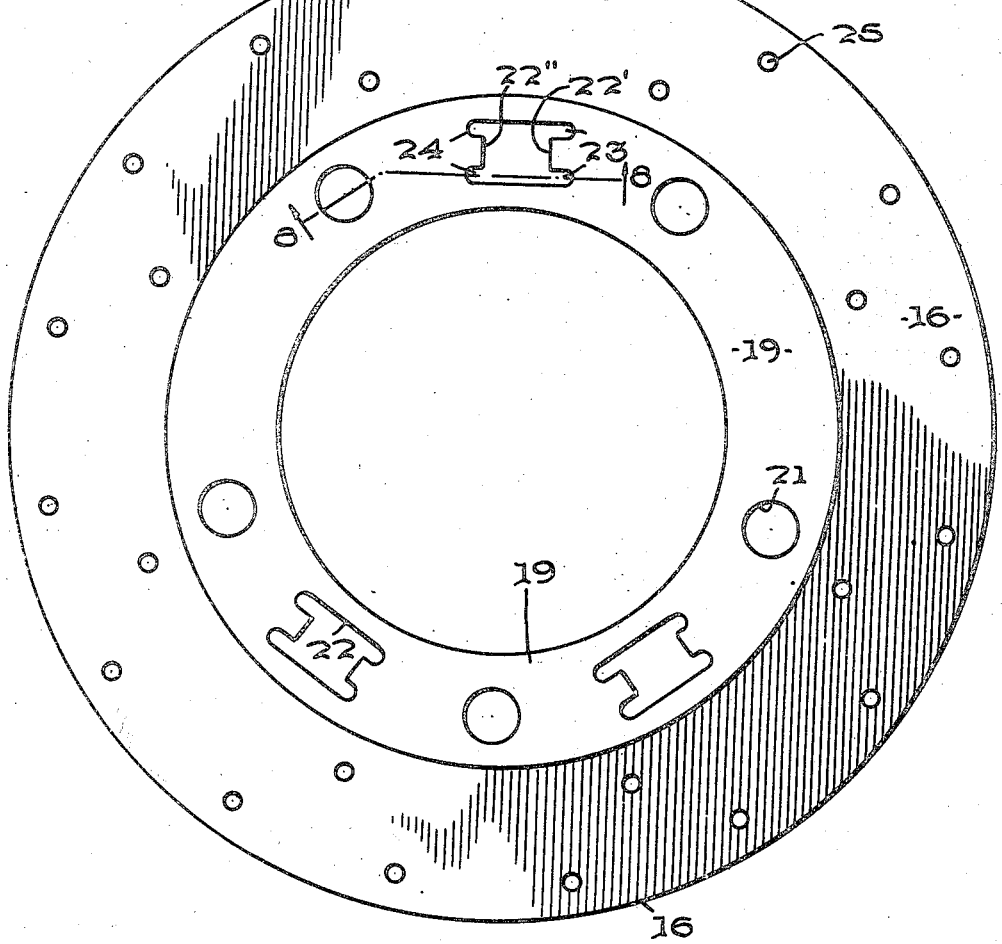
Figure 7 is a side elevation of the two plates stamped with stud openings and spring-receiving slots therein.
Figure 8:
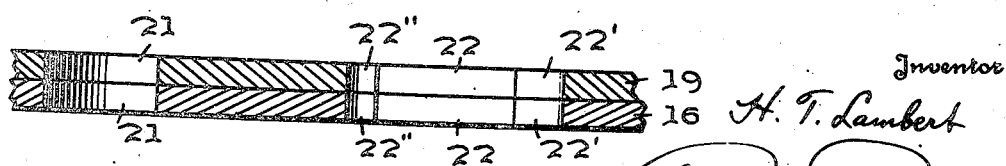
Figure 8 is an enlarged sectional view taken about on the plane indicated by line 8—8 of Figure 7.

Referring to the method of making this friction unit, one of the metal discs, as shown in Figure 6, is superimposed upon the other disc, in this instance the smaller or pressure-producing disc 19 being on top and disposed concentrically of the larger disc 16. In this position, a series of stud-receiving openings 21 and a series of spring-receiving slots 22 are stamped through the respective discs. The openings 21 are in the spaced relationship which characterize the arrangement of the studs 7 upon which the unit assembly is mounted, as later described. These openings are circular and slightly larger than the studs so as to easily slip over the same when the unit is applied to the wheel assembly. The slots 22 are somewhat H-shaped, as will be seen from Figure 7, but it will be observed that one of the tongues designated 22' at one end of the slot is longer than the tongue 22" formed at the other end of the slot. This arrangement provides a pair of deep throats 23 at one end and shallower throats 24 at the opposite end, these throats constituting spring-receiving seats. By reference to Figure 7, it will be noted that the base of the throats at one end of each of the slots 22 is relatively closer to the adjacent opening 21 than is the base of the throats at the other end relative to the next adjacent opening 21 at the opposite side of the slots 22. Consequently, when the springs 20 are mounted in the slots and the discs are mounted on the studs 7, the springs are under compression tending to cause the edges of the openings 21 to grip the studs. The longer tongues 22, as shown in Figure 3, will prevent the springs from being accidentally displaced from the slots and will maintain the connection together of the two discs. At the same time the openings and slots above referred to are stamped, a series of openings 25 are likewise cut in the larger disc to receive the rivets 18 in fastening the friction linings upon this disc.

Figure 4:
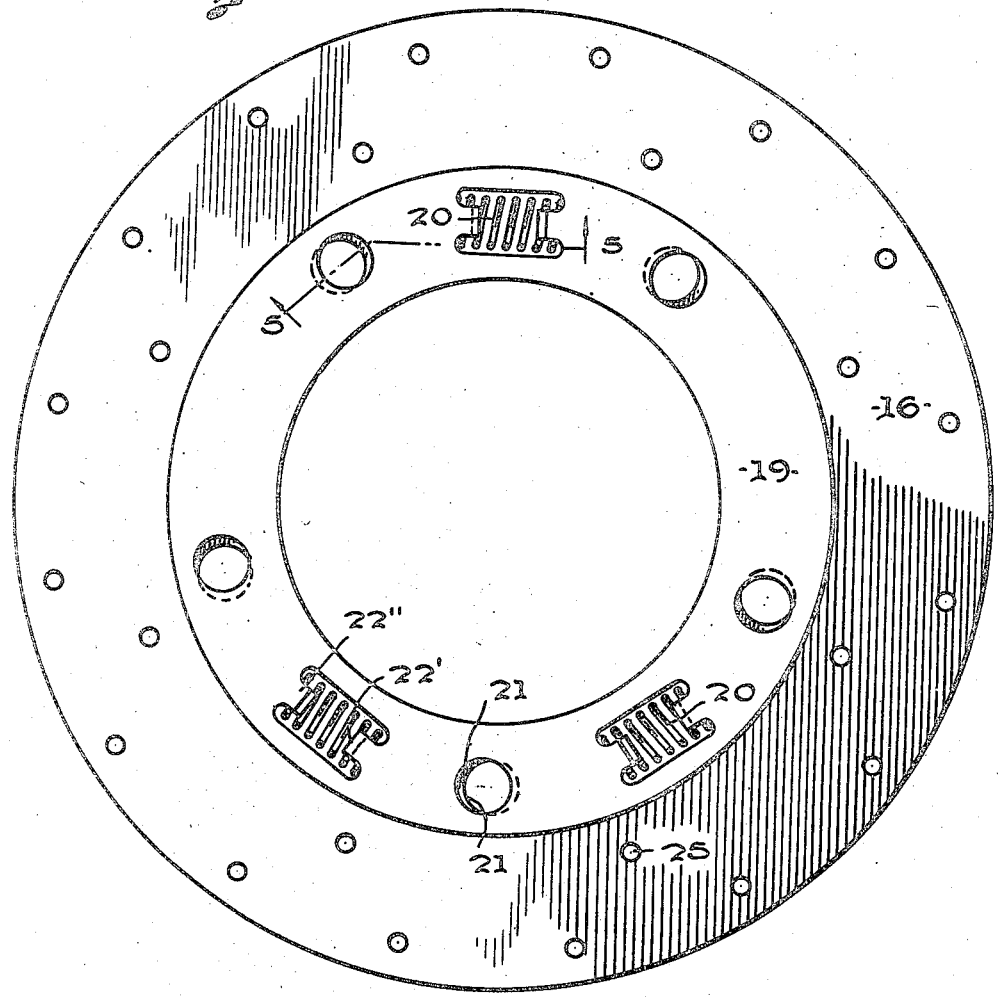
Figure 4 is a side elevation of the friction unit when removed from the vehicle wheel and showing the relationship of the stud-receiving openings of one plate relative to those of the complemental disc or plate.
Figure 5:
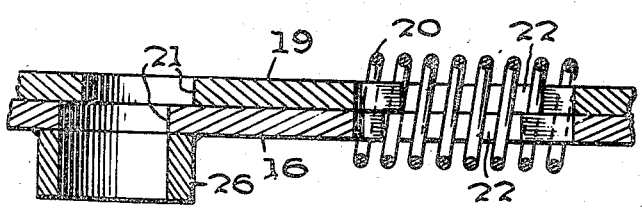
Figure 5 is a sectional view similar to Figure 3 and taken on the plane of line 5—5 of Figure 4, showing more particularly the relationship of the stud-receiving openings when the disc unit is dismounted from the wheel.

When the stamping operation above described is completed, the friction linings are riveted to the plate 16 and the disc 19 is then reversed so that they are disposed face-to-back, and by this particular method of procedure the slots 22 are reversely arranged with respect to one another. This is of primary importance because it reverses the tongues of these slots of one disc relative to those of the other so that when the discs are assembled and connected by mounting therein the spiral springs 20 each end thereof will encircle a pair of the respective tongues 22' and 22". When thus assembled, one of the plates is placed under compression by the expansion springs 20, and this throws the openings 21 of one plate out of alignment with the corresponding openings 21 in the other plate, as best seen in Figures 4 and 5 of the drawings. Since the plates are free to move with relation to each other preliminary to their mounting upon the wheel unit, the displacement of one of the sets of openings with relation to the other releases some of the pressure exerted by the springs. However, when mounting the assembly unit upon the studs 7, the openings 21 in each plate become aligned or registered, and the springs 20 are slightly compressed causing the gripping action of the walls of the openings 21 on the surface of the studs, as hereinbefore described. Since the pressure exerted on the studs is slight, relatively speaking, the unit assembly is free to slide on said studs during the braking action in the conventional operation of this type of disc brake. Preferably, I secure an open bearing sleeve 26 around each of the openings 21 of the larger disc 16 on the side opposite the pressure-producing disc 19 to thereby provide a relatively long bearing for receiving the stud extremities. This tends to prevent the edges of the openings 21 from cutting the surface of the studs where the sliding movement has any tendency to cant the disc with relation to the mounting studs.

The unit which is made up of the complemental discs 16 and 19 is easily assembled in the manner above described by the introduction of the coil springs into the spring-receiving slots 22, and no additional fastenings are required to maintain these parts in the assembled form, and due to the spring tension on the mounting studs the noise usually found in disc mountings of this nature is eliminated.

While the specific details of construction have been herein shown and described, the invention is not confined thereto as changes and alterations may be made without departing from the spirit thereof as defined by the appended claims.

I claim:

1. A friction assembly unit for vehicle brakes and the like, comprising two parts, each having corresponding stud-receiving openings therein, and tensioning means for connecting the parts together as a unit and tending to shift one part relative to the other into position disaligning the openings.

2. A friction assembly unit for vehicle brakes and the like, comprising a friction disc and a pressure-producing disc, each having corresponding stud-receiving openings for mounting the unit on a vehicle wheel, and spring means coacting with said discs adapted to be placed under compression when the openings of the respective discs aforesaid are brought into registry whereby the walls of the stud openings exert a stud-gripping action when the unit is mounted upon the vehicle wheel.

3. A friction assembly unit for vehicle brakes and the like, comprising a friction disc and a pressure-producing disc, each having corresponding registering stud-receiving openings and corresponding spring-receiving slots, and springs seated in said slots for connecting the discs together in face-to-back relation to form an assembly unit.

4. A friction assembly unit for vehicle brakes and the like, comprising a friction disc and a pressure-producing disc, said discs having corresponding stud-receiving openings therein and corresponding spring-receiving slots, said slots each having a spring seat at either end differing in depth dimension from one another, and springs seated in said slots for connecting the discs together in face-to-back relation with unlike seats in juxtaposed relation to thereby place one disc under pressure relative to the other and tending to disalign the stud openings of one disc relative to those of the other.

5. A friction assembly unit for vehicle brakes and the like, comprising a friction disc having a friction lining applied thereto and a pressure-producing disc of smaller diameter than the friction disc, each of said discs having a series of openings therethrough for mounting the unit upon the vehicle wheel, each of said discs also having elongated slots cut therein and each slot having a tongue at each end to form spaced throats constituting a spring seat, the throats at one end being deeper than at the other end, said discs being placed face-to-back so as to have the deeper seat end of each slot of one disc disposed adjacent the shallower seat end of the other disc slot, and an expansion spring seated in each pair of slots surrounding the tongues to hold the discs together with the openings of one disc overlapping those of another.

HOMER T. LAMBERT.

REFERENCES CITED

The following references are of record in the file of this patent:

UNITED STATES PATENTS

| Number | Name | Date |
|---|---|---|
| 1,899,599 | Thomas | Feb. 28, 1938 |
| 2,230,520 | Wemp | Feb. 4, 1941 |
| 2,317,599 | Freer | Apr. 27, 1943 |